United States Patent [19]

Schaer

[11] Patent Number: 4,478,567

[45] Date of Patent: Oct. 23, 1984

[54] FRONT LOADING CENTRIFUGAL SPIN CASTER

[75] Inventor: Leonard S. Schaer, Greenwich, Conn.

[73] Assignee: Tekcast Associates, Inc., New Rochelle, N.Y.

[21] Appl. No.: 425,895

[22] Filed: Sep. 28, 1982

[51] Int. Cl.³ .............................................. B29C 5/04
[52] U.S. Cl. ................................. 425/150; 164/154; 164/286; 425/183; 425/425; 425/434; 264/311
[58] Field of Search ............... 425/425, 434, 454, 150, 425/183; 164/286, 154

[56] References Cited

U.S. PATENT DOCUMENTS

| | | | |
|---|---|---|---|
| 3,616,494 | 11/1971 | Natter | 425/425 |
| 3,844,702 | 10/1974 | Dimmer | 425/425 |
| 4,063,863 | 12/1977 | Hilmoe | 425/425 |
| 4,350,481 | 9/1982 | Corea | 425/434 |

Primary Examiner—James Derrington
Attorney, Agent, or Firm—Anthony J. Casella; Gerald E. Hespos

[57] ABSTRACT

A front loading spin caster for spin casting a mold includes a vertically stationary top plate, a vertical movable bottom plate, a housing in which the top and bottom plates are disposed, a loading door disposed on one of the sides of the housing and adapted to allow the mold to be moved therethrough in a generally horizontal direction and placed on the bottom plate. The bottom plate can then be moved vertically upward to cause the mold to contact the top plate and a rotational force applied to the top plate propagates from the top plate through the mold to the bottom plate, the top plate, bottom plate and mold thus rotating together.

7 Claims, 5 Drawing Figures

FRONT LOADING CENTRIFUGAL SPIN CASTER

BACKGROUND OF THE INVENTION

The present invention is directed to the field of rubber mold centrifugal spin casting and more particularly to centrifugal spin casters used therefor.

Spin casting technology has been used for many years to produce costume jewelry, ornamental items, and has recently been employed to produce precision, high strength metal castings as well as thermoset plastic moldings, and wax investment casting patterns for engineered products. Spin casting offers the advantages of economical prototype and low volume production, short production lead time and low cost tooling. Further, it produces precision parts with close tolerances, smooth surfaces, and excellent detail at low per piece cost.

Basically, spin casting involves the use of a pair of complementary disc shaped rubber mold halves which are formed with a series of cavities therein. When the complementary rubber mold halves are placed together, a multi-cavity mold is formed. The multi-cavity rubber mold is clamped by air pressure between metal plates in a motor driven table. As the mold spins on the table, molten metal, liquid plastic or molten wax is poured into the center sprue of the mold, and the metal, plastic, or wax, forced outwardly through radial passageways or "runners" in the mold by centrifugal force, fills the mold cavities. Spin speeds typically range from 100 to 1000 RPM, depending on the size of the mold and the material being cast. The rotation may then be stopped, the mold opened, and the cast parts removed.

Heretofore, spin casters have been made such that access to the rotating turntable is from the top of the machine. The spin casters are typically provided with a horizontally disposed turntable having a plurality of vertically disposed clamp retainers. In one type of system for example, a central opening is provided in the turntable through which an hydraulic push rod is disposed. The push rod bears against a mold ram plate on top of and parallel to the turntable. The mold is adapted to be placed on top of the mold ram plate and a heavy metallic mold cover plate is placed on top of the mold. The mold coverplate is arranged such that clamp stays fixed thereto are placed underneath, and thus captive by, the clamp retainers attached to the turntable. After so adjusting the mold coverplate, the push rod may be actuated to thereby push the mold ram plate into firm engagement with the mold. In other systems, such as a "pancake" O-ring air clamping system, the pushrod is replaced by a hollow steel tube which allows the mold ram plate to be moved upwardly by forcing air directly against the bottom of the plate. In either case, the turntable, along with the mold and plates, are then rotated from the bottom of the machine. Molten metal, plastic, or wax material is poured through a central opening in the mold coverplate and thus delivered to the mold. After the spinning cycle is completed, the turntable, mold plates and the mold are brought to a stop, and the mold ram plate is separated from the mold coverplate. The mold coverplate is then released from the clamp retainers and lifted vertically from the machine by the operator to thus expose the mold. The mold is then removed by also lifting it vertically from the machine to complete the process.

There are many drawbacks associated with the above-described use of the prior art spin casting machines. The operator is burdened with several heavy lifting operations, specifically the vertical lifting into and from the machine of the mold and the heavy coverplate. Since two such operations (in the upward and downward directions) are required for both the mold and the coverplate, operation of the spin caster results in operator fatigue. Since the use of a heavy turntable and upstanding clamp retainers is required, the total spinning mass is high, resulting in slow startup and stopping times. This, coupled with the number of steps involved in placing the mold into and removing it from the spin caster result in very inefficient operation. Further, the upstanding clamp retainers present a serious hazard to the operator since speeds of up to 1000 RPM are not uncommon. Since the turntable, plates and the mold are turned from the bottom of the spin caster, the prior art spin casters are quite large in size and require an elaborate mold clamping/drive pulley mechanism for isolating the rotational movement of the apparatus from the hydraulic unit which provides the mold clamping pressure. Finally, since the mold and mold coverplate are hand loaded from the top of the machine, it is extremely difficult to utilize automatic liquid feeding devices.

OBJECTS AND SUMMARY OF THE INVENTION

It is therefore an object of the invention to provide a spin caster which overcomes the difficulties associated with the prior art devices.

It is a further object of the invention to provide a front loading, top plate driven spin caster.

It is a further object of the invention to provide a spin caster which is of compact size and which can be table mounted.

It is a further object of the invention to provide a spin caster which is much more safe in operation than the prior art devices.

It is a further object of the invention to provide a spin caster which requires fewer operations and is thus more efficient than the prior art devices.

It is a further object of the invention to provide a spin caster which requires significantly less spinning mass than the prior art spin casters and is thus easier to stop and start than the prior art devices.

It is a further object of the invention to provide a spin caster which eliminates virtually all heavy lifting and thus greatly reduces operator fatigue.

It is a further object of the invention to provide a spin caster which readily lends itself to use with an automatic liquid feed system.

It is a further object of the invention to provide a highly efficient method of spin casting utilizing a front loading spin caster.

In accordance with the first aspect of the invention, a spin casting machine for spinning a mold includes a spin caster housing, a vertically stationary top plate disposed with the housing, a vertically movable bottom plate also in the housing, a loading door on a side of the housing, and means for applying a rotational force to the top plate. The vertically stationary top plate is adapted to rotate on a substantially vertical axis and has an aperture at the center thereof through which a liquid material is adapted to pass into the mold. The vertically movable bottom plate is adapted to rotate about the same substantially vertical axis. The loading door is adapted to allow the mold to be moved therethrough in a generally horizontal direction and placed on the bottom plate. The means for moving the bottom plate vertically upward causes the mold to contact the top plate such that the rotational force applied to the top plate propagates from the top plate through the mold to the bottom plate, the top plate, bottom plate and mold thus rotating together.

Preferably, the means for applying the rotational force to the top plate includes a pulley integral with the top plate and adapted to be engaged by a motor driven pulley belt. The means for moving the bottom plate vertically upward may comprise an air cylinder/piston assembly responsive to a control device, the control device selectively causing the cylinder/piston assembly to move the bottom plate up or down. Specifically, the control device may include a switch operatively connected to the loading door such that the bottom plate is moved up when the door is closed and down when the door is opened.

The top plate is preferably connected to the spin caster housing by way of a housing channel structure secured to the spin caster housing and by a first bearing for rotationally isolating the top plate from the channel structure and housing. The bottom plate is preferably connected to the spin caster housing by way of the cylinder/piston assembly which is in turn secured to, and suspended from the channel structure, and by a second bearing for rotationally isolating the bottom plate from the piston cylinder assembly.

Further, the bottom plate may be provided with a plurality of indexing pins and a greater number of indexing pin holes into which the pins are adapted to be disposed, such that molds of different sizes may be placed in the proper center locations on the bottom plate by placing the molds in abutment with the pins, the pins being movable to different pin holes to accommodate different size molds.

In accordance with the second aspect of the invention, a method for spin casting a mold in a spin caster includes the steps of loading the mold onto a vertically movable bottom plate and underneath a vertically stationary top plate, moving the bottom plate vertically upward to cause the mold to contact the top plate, applying a rotational force to the top plate, introducing a liquid material into the mold, terminating the rotational force, moving the bottom plate vertically downward, and removing the mold. The mold is loaded through a side of the spin caster housing onto the bottom plate. The top and bottom plates are adapted to rotate about a substantially vertical axis. The rotational force which is applied to the top plate propagates through the mold to the bottom plate to thus cause the top plate, the bottom plate and the mold to rotate together. The liquid material is introduced into the mold through an aperture in the top of the top plate.

Preferably, the step of loading comprises the steps of opening a loading door disposed on the side of the housing, thereby automatically moving the bottom plate vertically downward, moving the mold in a substantially horizontal direction onto the bottom plate, and closing the door to thereby automatically move the bottom plate vertically upward. The step of moving the mold onto the bottom plate may further comprise moving the mold into abutment with a plurality of indexing pins on the bottom plate.

BRIEF DESCRIPTION OF THE DRAWINGS

These and other objects, aspects and embodiments of the invention will be described with reference to the following drawing figures of which.

DETAILED DESCRIPTION OF THE INVENTION

Figure 1:
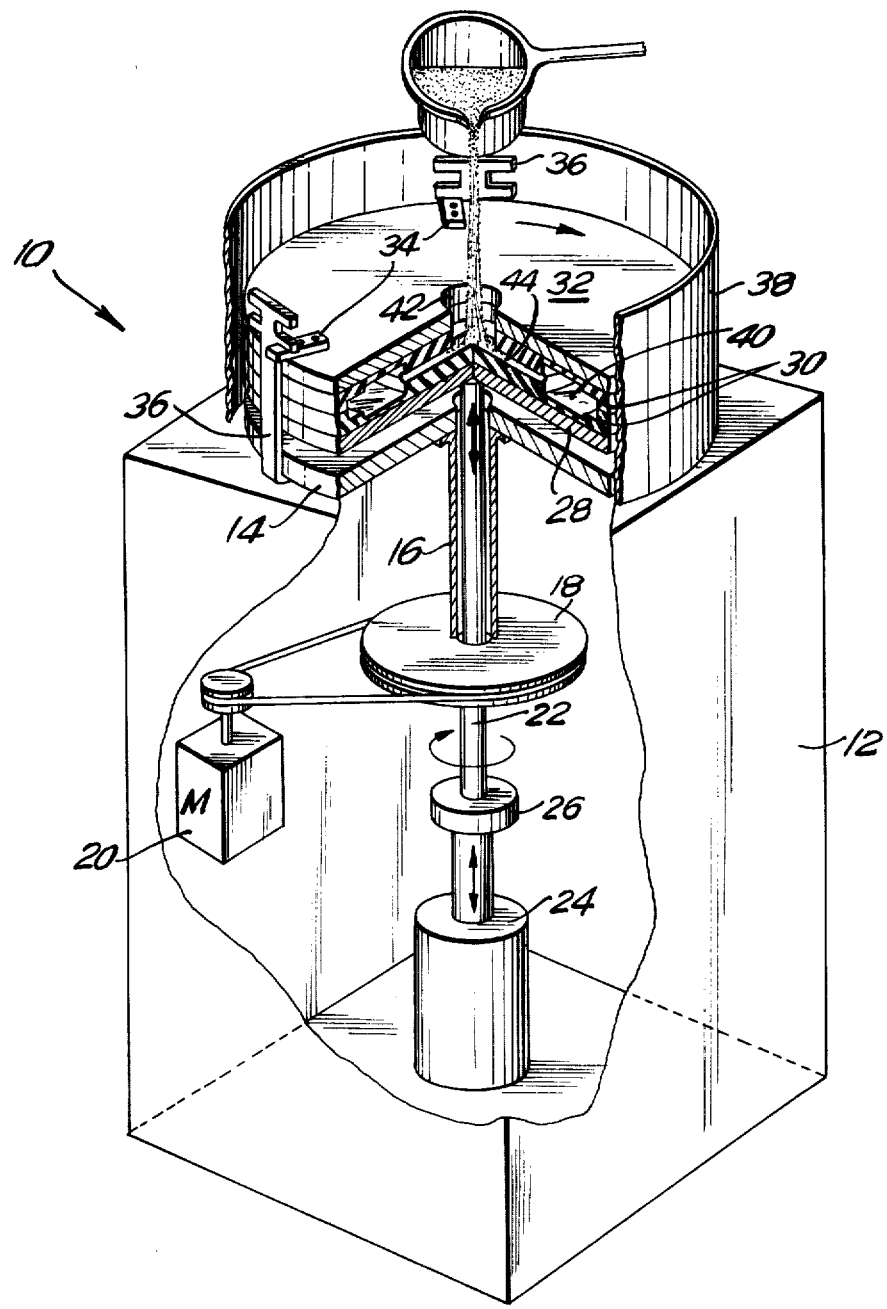
FIG. 1 is a perspective and partial cross-sectional view of a prior art spin caster.

One example of a prior art spin caster 10 is illustrated in FIG. 1. Mounted on top of housing 12 is a rotatable turntable 14 which rotates on hollow shaft 16. Shaft 16 is fixed at its top to the bottom of the turntable 14 and fixed at the bottom to pulley 18. The pulley 18 is controlled by motor 20. Mounted within the hollow shaft 16 is a push rod 22 which is actuated by hydraulic ram 24 thereby moving the push rod up or down. The push rod is rotationally isolated from the ram 24 by means of a bearing coupler 26. The top of the push rod 22 bears against the mold ram plate 28 onto which the rubber molds 30 are placed. The mold coverplate 32 is then placed on top of the rubber molds 30 and positioned such that the stays 34 are disposed underneath the clamp retainers 36 which are secured to the bottom of the turntable. Finally, a metallic shield 38 is provided around the turntable, ram plate, molds and coverplate. A hinged cover, not shown, having a central opening, is included as well.

In operation, the operator places the rubber molds 30 and the coverplate 32 onto the mold ram plate 28, moves the stays 34 under the clamp retainers 36 and closes the hinged cover. The ram 24 is actuated to move the push rod and the ram plate 28 into abutment with the rubber molds 30. The motor 20 may then be actuated to turn shaft 16 and turntable 14, thus resulting in the rotation of the entire assembly of the turntable 14, plates 28 and 32 and the rubber molds 30. The liquid may then be ladled into the mold cavity 40 through a central sprue 42 provided in the mold coverplate 32 and the top rubber mold. The centrifugal force provided by the rotation forces the liquid material outwardly through channels or "runners" 44 into the mold cavities 40. After a short time, the motor 20 can be stopped and the operator waits until the entire assembly terminates its rotation, at which time the cover is opened, the ram is deactivated and the mold coverplate 32 is rotated to move the stays 34 out from under the clamp retainers 36. The mold coverplate must then be lifted vertically away from the rubber molds, and the rubber molds are subsequently lifted vertically off of the ram plate 28.

As will be appreciated by those skilled in the art, the foregoing series of steps is time consuming and causes a great deal of operator fatigue, especially since several of the steps involve bending over the machine and lifting the heavy coverplate 32 and molds 30 into and out of the spin caster. More specifically, the majority of operations do not involve the actual spin casting, but rather involve "set-up" steps, resulting in inefficient operation. Further, since the spin caster is rotated from the bottom by shaft 16 and the mold ram plate 28 is operated by ram 24 also from the bottom of the unit, the prior art spin caster must be provided rather elaborate apparatus such as the hollow shaft and pulley combination 16/18. This also leads to a rather big "stand alone" structure, certainly not the type of apparatus which could be conveniently disposed on a table top. Still further, since three relatively heavy metal plates 14, 28 and 32, in addition to the rubber molds 30, must rotate, the startup and stop times are undesirably high due to the high momentum and inertia produced by the massive apparatus. This also requires a substantial energy output by the machine. It is also readily apparent that even though a hinged cover is usually provided for the apparatus, the upwardly extending projections presented by the clamp retainers 36, represent a severe hazzard to the operator. Finally, it is extremely difficult to operate the prior art spin caster with an automatic feed device, which must be located above the spin caster, since access to the spin caster is from the top.

Figure 2:
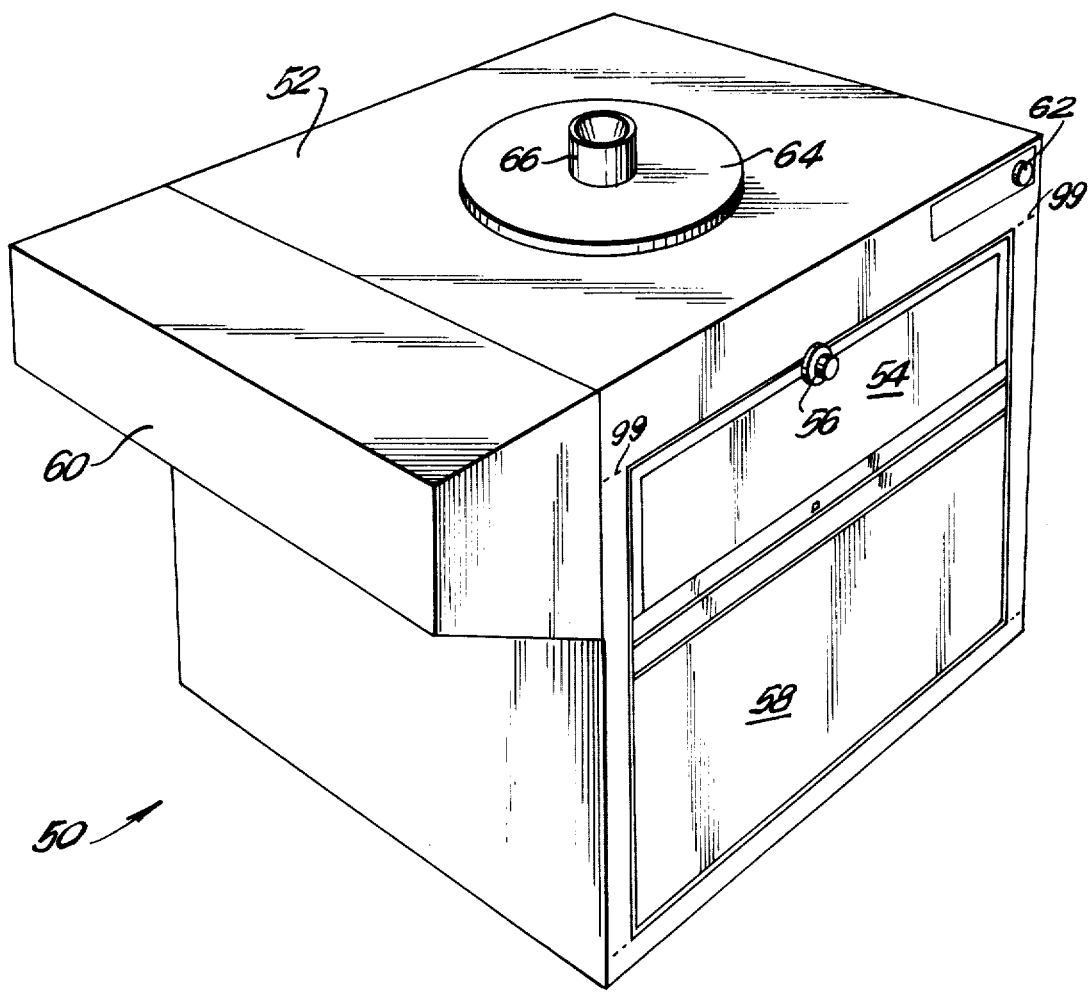
FIG. 2 is a perspective view of the front loading spin caster in accordance with the present invention.

The front loading spin caster in accordance with the present invention avoids all of the above-mentioned difficulties inherent in the prior art devices. As shown in FIG. 2, the front loading spin caster 50 is of much more compact design and can be conveniently placed on a table top or virtually any other location as desired. The unit is provided with a flat and substantially unobstructed top surface 52 upon which an automatic liquid dispensing and metering system may be disposed. The top surface 52 can also be used as a table top upon which molds ready to be processed may be placed. As readily appreciated by those skilled in the art, such arrangements are difficult if not impossible with the top-loading prior art device.

Still with reference to FIG. 2, the front loading spin caster 50 is provided with an outwardly opening loading door 54 which may be opened and securely shut by means of spring loaded latch 56. Underneath the loading door 54 is a removable front access panel 58. A motor guard 60 is provided alongside the upper portion of the spin caster and is adapted to surround an electronic SCR motor 61 (FIG. 4) having an adjustable speed control from about 150 to 1,000 RPM. The top surface of the guard 60 can also be used as a table top for molds ready to be processed. A switch 62 for controlling the motor is provided at convenient location on the spin caster housing. The top surface 52 of the spin caster is provided with a heat resistant pad 64 made from transite, masonite or other suitable heat resistant materials. Centrally disposed on the top of the pad 64 is a pouring crucible 66 through which the liquid material is poured.

The details of the front loading spin caster in accordance with the present invention will now be discussed with further reference to FIG. 3. Secured to the housing of the spin caster by welding or other suitable means is channel 68. Suspended from the channel 68 is roller bearing assembly 70. A fixed position pulley/mold top plate 72 is connected to the roller bearing assembly by means of retainer plates 74 and bearing retainer 76 such that the fixed position pulley/top plate 72 can rotate in a horizontal plane relative to the fixed channel 68. The fixed position pulley/top plate 72 is preferably made out of aluminum or another light weight but strong metal or metal alloy. The bottom of the crucible 66 communicates with a hollow sprue 78 which is lined with a sprue insert 80 made of highly polished, hardened steel. As shown, a small gap is provided between the sprue insert 80 and the crucible 66, since the insert 80 rotates with the plate 72 while crucible 66 remains stationary.

Also secured to and suspended from the channel 68 is an air cylinder 82 having an air inlet 84 at the bottom thereof and a piston 86 at the top thereof. A movable bottom mold clamping plate 88 is connected to the piston 86 by means of a thrust bearing assembly 90 integral with the plate 88 and a block 92 between the thrust bearing 90 and the piston 86. The thrust bearing 90 allows rotation of the plate 88 in a horizontal plane relative to piston 86. Provided on the top of the clamping plate 88 are positioning means, such as a plurality of indexing pins (usually 3) which may be placed in different locations on the plate 88 for the proper location of different size molds. However, other means for positioning the plate may be employed as desired.

Figure 3:
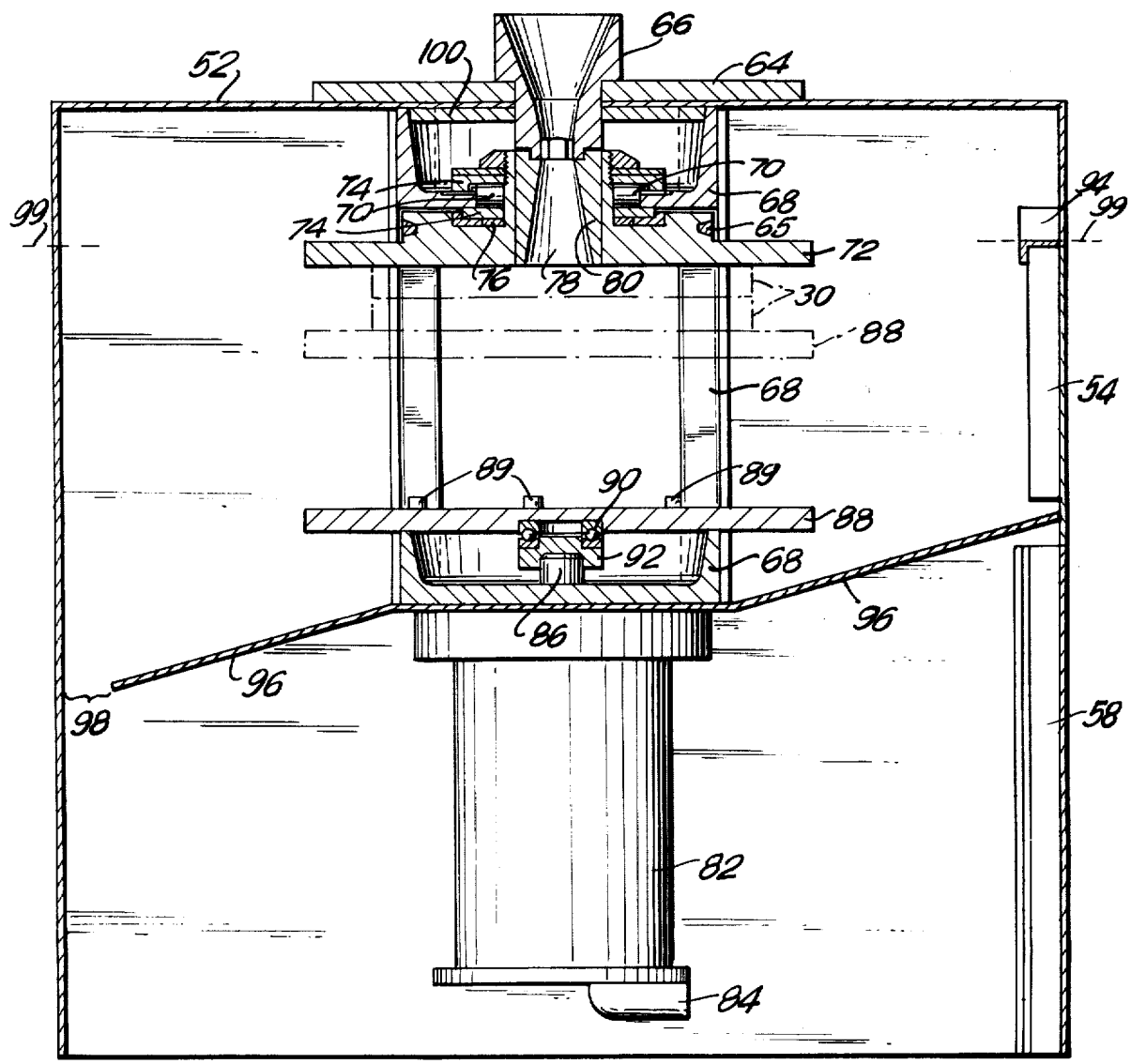
FIG. 3 is a front cross-sectional view illustrating the details of the front loading spin caster in accordance with the present invention.

Also shown in FIG. 3 are the loading door 54 and the removable front panel 58. Operatively connected to the loading door 54 is a switch 94 which controls the air cylinder 82. Also provided is a collector tray 96 attached along one end to the channel and along the other end to the housing of the spin caster except for portion 98. The top surface 52 of the spin caster may be removed from the remaining portion of the spin caster housing at a location illustrated by the dashed lines 99 in FIGS. 2 and 3 in order to allow access to the top of the spin caster machinery for maintenance and the like. Although the top surface 52 will usually be connected to the remaining portion of the housing, the separation may be accomplished by removing a set of screws, or other fasteners. Finally, a support plate 100, fixed to the channel 68 is provided underneath the top surface 52 to allow for mounting of an automatic liquid feeding system.

Figure 4:
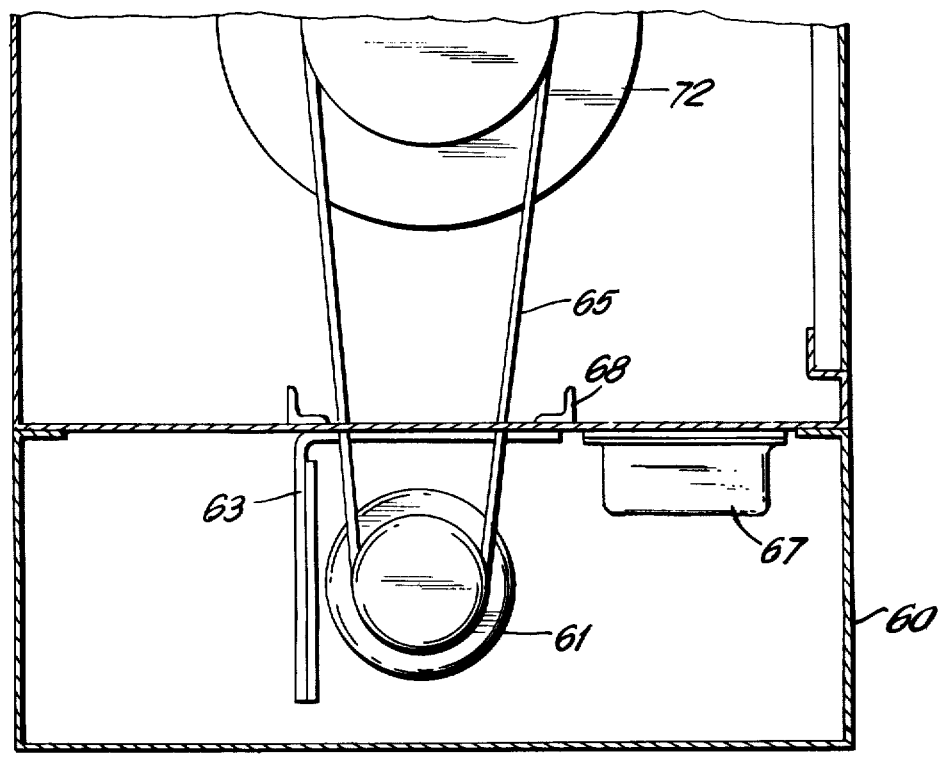
FIG. 4 is a top plan view of the top plate, motor and drive belt employed in the present invention.

As shown in FIG. 4, the motor 61 is connected to channel 68 by means of bracket 63 or other suitable means. A drive belt 65 is provided for rotating the top plate 72. An SCR motor control unit 67 is provided alongside the motor 61 and operates in a routine manner to provide any speed of rotation for the top plate 72 between about 150 and 1000 RPM. Associated with the SCR motor control unit 67 is a timer which functions in a well known manner to instruct the control unit that the spin cycle is complete. The motor control unit 67 provides dynamic braking of the motor upon termination of the spin cycle. The actual control dial for setting the speed of the motor 61 is disposed in a control panel separate from the spin caster. In fact, aside from the motor control 67, timer, push buttom 62 and switch 94, all other controls required for the spin caster are preferably disposed on a control panel separate from the spin caster, thus allowing the control panel to be mounted at a more convenient location, and thereby reducing still further the size of the spin caster.

Figure 5:
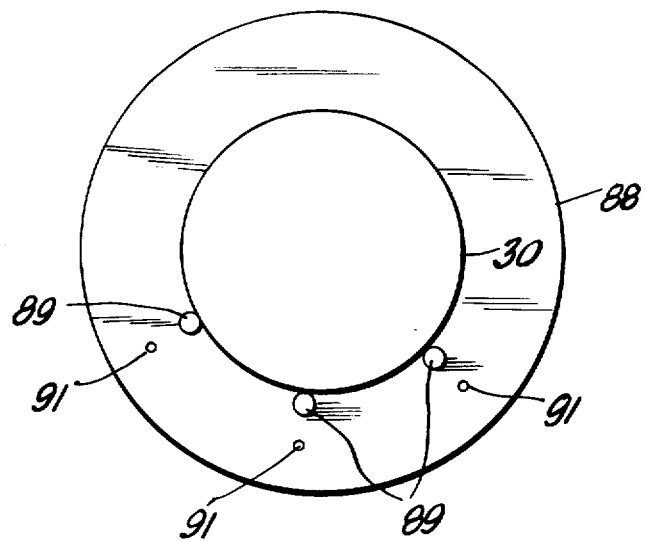
FIG. 5 is a top plan view of the bottom plate having indexing holes, indexing pins and a mold in abutment therewith in accordance with the present invention.

In operation, the operator opens the loading door 54 to a horizontal position, thus deactivating the switch 94 which in turn causes piston 86 to retract within the air cylinder 82 to the position shown in solid lines in FIG. 3. With the loading door 54 opened to a horizontal position, it can be used as a tray to help facilitate the loading of the molds into the spin caster. The operator then places the molds 30 on the movable bottom mold clamping plate 88 such that the molds come into abutment with the indexing pins 89. As shown in FIG. 5, the indexing pins 89 are each disposed within one of a plurality of pin holes or slots 91 positioned on the plate 88 so as to allow the proper location of the molds 30 on the plate. Preferably, the pins are arranged in less than 180° of arc to facilitate the entry and removal of the molds 30 onto and from the plate. The positions of the pins can readily be changed by the operator depending upon the size of the molds currently being employed.

The operator may then close the loading door 54 thereby closing the switch 94 to cause activation of the air cylinder 82. The piston 86 rises to thereby clamp the molds 30 between the movable bottom plate 88 and the fixed position top plate 72, in the position indicated by the dashed lines. The operator may then push the switch 62 (FIG. 2) in order to start the motor 61. Alternatively, the micro switch 94 could also be used to start the motor if desired. The motor 61 functions to turn the entire assembly of the top plate 72, mold 30 and bottom plate 88 by means of the drive belt 65 driven about the pulley section of the plate 72. However, other means to provide the rotation, such as gears, and the like, may be employed if desired. Plate 72, along with the sprue insert 80, retainer plates 74 and bearing retainer 76 will rotate about the roller bearing assembly 70 in a horizontal plane relative to the channel 68 and the spin caster housing. The bottom plate 88 will rotate on the thrust bearing 90 parallel to, and through the same axis of rotation as the top plate 72. The operator can then either manually ladle the liquid material into the crucible 66 or can operate the automatic metal, plastic or wax dispensing and metering system if one is in use. The liquid material enters the mold 30 through the sprue 78 and is forced into each mold cavity by the centrifugal force exerted thereon. When the spin cycle is over, the motor control functions to dynamically brake the plates in response to a signal from the timer to quickly stop the rotation of the plates and molds. If however, the loading door 54 is opened during the spin cycle, the switch 94 provides to signal to the motor control to effect the dynamic braking and termination of the motor. Upon fully opening the loading door 54 the switch 94 will deactivate the air cylinder 82 to cause the piston 86 to retract to within the air cylinder 82 to the position illustrated in solid lines in FIG. 3. The operator may then simply slide the finished mold off the bottom plate 88 and out through the loading door 54 which acts as a tray in its horizontal position. The operator can then immediately repeat the process with another mold taken from the top "table" surface 52, the top of guard 60, or other convenient location.

The position of the top and bottom plates is designed such that approximately 7 inches clearance are provided between the two in the position illustrated in solid lines in FIG. 3, to thus allow any residual material within the sprue 78 to be cleared from the sprue upon retraction of the bottom plate 88. Any such residual material will be collected by collector tray 96 and deposited at the bottom of the spin caster housing underneath the gap 98 in the collector tray 96.

It will thus be appreciated that the front loading spin caster in accordance with the present invention provides an extremely efficient, simple and rapid spin casting technique. Since the only physical movement which need be employed by the operator is the placing and removing of the mold onto and from the bottom plate 88, a tremendous amount of effort is eliminated, since the operator is not required to vertically install and remove the mold and a heavy mold cover plate, as in the prior art. Since this is all that is required of the operator, the operation of the spin caster is much more efficient than the prior art spin casters, since fewer "set-up" operations are required. Since the plates and mold are driven from the top plate, separate from the piston/air cylinder assembly, the elaborate arrangement of the hollow shaft and push rod utilized in many of the prior art spin casters in not required. Since only the top and bottom plates 72 and 88 are involved in the spinning operation, rather than the three plates and the multiple clamp retainers employed in the prior art spin casters, less mass is turned in the present spin caster resulting in faster starts and stops and lower energy requirements. Since the present spin caster is driven from the top and is loaded from the front, rather than the top, it can be arranged with a very short profile allowing the unit to be used on a table top or on any other convenient support. Since the molds are loaded from the front, a relatively unobstructed top surface of the spin caster is provided, upon which an automatic dispensing and metering system can readily be installed. Finally, since none of the exposed protuberances such as the clamp retainers required on the prior art spin casters are required, the present spin caster is significantly safer to operate.

Although the present invention has been described with reference to the foregoing specification and drawings, many modifications, changes, additions and deletions to the invention may be made within scope and spirit thereof. For example, many different positioning means other than pins, and many different rotation means other than the pulley and belt arrangement, are within the purview of the invention. It is to be understood that the foregoing description of the invention is illustrative and not limiting, the scope of the invention being defined by the following claims.

What is claimed is:

1. A spin casting machine for spinning a mold, comprising:

a spin caster housing;

a vertically stationary top plate disposed within the housing and adapted to rotate about a substantially vertical axis, said top plate having an aperture at the center thereof through which a liquid material is adapted to pass to said mold;

a vertically movable bottom plate disposed within the housing and adapted to rotate about said substantially vertical axis;

a loading door disposed on a side of the housing and adapted to allow said mold to be moved therethrough in a generally horizontal direction and placed on the bottom plate;

means for moving said bottom plate vertically upward to cause the mold to contact the top plate; and means for applying a rotational force to said top plate, said rotational force propagating from said top plate through said mold to said bottom plate, the top plate, bottom plate and mold thus rotating together.

2. The spin casting machine of claim 1 wherein said means for applying a rotational force to the top plate comprises a pulley integral with said top plate and adapted to be engaged by a motor driven pulley belt.

3. The spin casting machine of claims 1 or 2 wherein said means for moving the bottom plate vertically upward comprises an air cylinder/piston assembly responsive to control means, said control means selectively causing said cylinder/piston assembly to move said bottom plate up or down.

4. The spin casting machine of claim 3 wherein said control means comprises a switch operatively connected to said loading door such that said bottom plate is moved up when said door is closed and down when said door is opened.

5. The spin casting machine of claim 3 wherein said top plate is connected to said spin caster housing by way of a housing channel structure secured to said spin caster housing and first bearing means connected to said channel structure and to said top plate to thus rotationally isolate said top plate from said channel structure and housing.

6. The spin casting machine of claim 5 wherein said bottom plate is connected to said spin caster housing by way of said cylinder/piston assembly which is in turn secured to, and suspended from, said channel structure, and by second bearing means for rotationally isolating said bottom plate from said piston/cylinder assembly.

7. The spin casting machine of claim 3 of wherein said bottom plate is provided with a plurality of indexing pins and a greater number of indexing pin holes into which said pins are adapted to be disposed, such that molds of different sizes may be placed in the proper locations on the bottom plate by placing said molds in abutment with said pins, said pins being movable to different pin holes to accommodate different size molds.

* * * * *